United States Patent Office 3,314,988
Patented Apr. 18, 1967

3,314,988
PROCESS FOR THE PREPARATION OF HYDROXYALKYL METHACRYLATES
Joseph W. Nemec, Rydal, Edward L. Wolffe, Furlong, and Sheldon N. Lewis, Willow Grove, Pa., assignors to Rohm & Haas Company, Philadelphia, Pa., a corporation of Delaware
No Drawing. Filed Jan. 2, 1964, Ser. No. 335,417
5 Claims. (Cl. 260—486)

This invention deals with a method for the preparation of hydroxyalkyl methacrylates. It more particularly deals with a method for the preparation of hydroxyethyl, hydroxypropyl and hydroxybutyl methacrylates.

It is known that hydroxyalkyl methacrylates can be prepared from alkylene oxides and methacrylic acid by the use of soluble amine catalysts. The amine must, however, be removed from the product before the material is satisfactory in most applications. Since the products are volatile materials, this purification is normally accomplished by a reduced pressure distillation, a process which is time consuming, expensive and usually involves a loss in yield. Ion-exchange resins having active amine sites can catalyze the reaction and yield a product which is free of catalyst. This mode of synthesis is, however, successful principally in bulk and the synthesis of a reactive monomer in bulk involves great hazards from possible uncontrollable polymerization.

The present invention produces hydroxyalkyl methacrylates in high yields, of high purity and essentially free of catalyst by a process which is inherently safe. The product can be employed in most applications, such as coating formulations, without the need of purification procedures. The product can, of course, be concentrated or distilled, if desired.

The present process is conducted by reacting a selected alkylene oxide with methacrylic acid in the presence of potassium methacrylate and an inert volatile organic solvent in a stated temperature range, to be more fully described hereinafter.

The potassium methacrylate employed to initiate the reaction of the present invention may be used as such or prepared in situ from potassium hydroxide as desired. For reasons not completely understood, one cannot employ lithium methacrylate or sodium methacrylate and obtain the valuable benefits of the present process. While sodium methacrylate and lithium methacrylate in some respects initiate a reaction similar to that employed in the present process, neither functions in the way that the potassium methacrylate does and, in addition, the sodium and lithium methacrylates have solubility characteristics markedly diverse from those of potassium methacrylate. Potassium methacrylate forms an essentially 1:1 molar complex with methacrylic acid and it is in this form that this catalyst precipitates almost totally from solution when the synthesis is complete and the product is cooled. Neither sodium nor lithium methacrylate forms such a complex with methacrylic acid and separation procedures involving sodium or lithium methacrylate are complex and burdensome. Furthermore, potassium acrylate does not perform in a way corresponding to potassium methacrylate and the present process is, therefore, not adaptable to the corresponding acrylates.

Potassium methacrylate is used in amounts of about 2 to 8 mole percent, preferably 5 to 7 mole percent based on the methacrylic acid employed and is readily recycled in subsequent preparations. Thus, it can be readily ascertained that economic benefits accrue to the process of the present invention.

Generally, the present process is conducted in the substantial absence of water, although a small amount can be tolerated. When the potassium methacrylate is prepared in situ by adding potassium hydroxide to the reaction system containing methacrylic acid, small amounts of water are necessarily present. This water is usually, but not necessarily, removed, preferably by stripping it off during the early stages of the reaction.

An inert volatile organic solvent is employed, preferably such that the catalyst complex, discussed hereinbefore, is soluble in the system at the reaction temperature and substantially insoluble at 10° C. and below, particularly at 0° C. Typical solvents include aromatic and aliphatic hydrocarbons, such as octane, cyclohexane, benzene, toluene, xylene and the like. A preferred solvent is xylene, especially where the product is to be used in coating systems that employ xylene as a solvent. Solutions of any concentration desired can be made; however, 30 to 60% solutions are preferred from a consideration of safety of operation and reactor productivity.

It is possible to add the reactants together in any desired order or pre-mix all of them substantially at once, preferably at ambient temperature, and then heat until the reaction temperature range is reached. It is preferred to pre-mix all but the alkylene oxide, heat the system to the reaction temperature, and then to introduce gradually alkylene oxide over a desired period of time (1 to 3 hours is generally adequate) into the remainder of the reaction system.

The present reaction is conducted in the range of about 65° C. to about 130° C., preferably about 70° C. to about 125° C. Generally speaking, the lower the molecular weight of the alkylene oxide, the lower the reaction temperature required. A preferred temperature range when ethylene oxide is employed is about 70° C. to about 90° C.; when propylene oxide is used, about 95° C. to about 115° C.; and when butylene oxide is used, about 100° C. to about 125° C.

The product is obtained in good color, in high purity and in yields that consistently reach 95% and above. In addition to the product, there are usually small amounts of unused methacrylic acid and potassium methacrylate present, together with a trace of by-product glycol dimethacrylate. In most instances, the small amounts of these compounds present with the product are not objectionable, especially when the hydroxyalkyl methacrylate is to be used in coating formulations. One of the outstanding attributes of this invention is that a method is provided for obtaining hydroxyalkyl methacrylates that are useful in thermosetting acrylic coatings for automobiles, appliances and the like.

The present invention may be more fully understood in the following examples that are offered by way of illustration and not by way of limitation. Parts by weight are used throughout.

*Example 1*

Methacrylic acid (86 parts—1.0 mole), toluene (135 parts), potassium methacrylate (6.9 parts—.056 mole) and the monomethyl ether of hydroquinone (.08 part)

are placed in a vessel, stirred and heated to 85° C. The vessel is sealed and ethylene oxide (39.6 parts—0.9 mole) is added over a three-hour period. After the feed is complete, a four-hour period at 85° C. is provided. This mixture is then cooled to 0° C. whereupon greater than 90% of the potassium methacrylate precipitates from solution as the methacrylic acid complex. The product, after separation from the catalyst by filtration, is a very light yellow toluene solution of the following assay:

| | Percent |
|---|---|
| Hydroxyethyl methacrylate (by vapor phase chromatograph) | 40 |
| Methacrylic acid (by titration with standard base) | 4 |
| Ethylene glycol dimethacrylate (by vapor phase chromatograph) | 0.2 |
| Potassium methacrylate (by wet chemical analysis for potassium) | 0.15 |

This material can be used in coating formulations without further purification.

Example 2

Methacrylic acid (86 parts—1.0 mole) xylene (135 parts), potassium methacrylate (6.9 parts—.056 mole) and the monomethyl ether of hydroquinone (.08 part) are placed in a reactor, stirred and heated to 105° C. The reactor is sealed and 52.5 parts (0.9 mole) of propylene oxide is fed over a period of 90 minutes. After a hold period of four hours, the free methacrylic acid content is 6.0%. The batch is then cooled to 0° C. whereupon the catalyst complex precipitates from solution. A filter finger is placed in the reaction vessel and the product is drawn off leaving the catalyst in the reactor. Analysis of the product solution shows:

| | Percent |
|---|---|
| Hydroxypropyl methacrylate (by vapor phase chromatograph) | 41 |
| Methacrylic acid (by titration with standard base) | 5 |
| Potassium methacrylate (by wet chemical analysis for potassium) | 0.15 |
| Propylene glycol dimethacrylate (by vapor phase chromatograph) | 0.2 |

To the catalyst remaining in the reactor are charged 135 parts xylene, 82 parts methacrylic acid, 0.7 part potassium methacrylate and .08 part of the monomethyl ether of hydroquinone. The reaction then proceeds as above. Propylene oxide (52.2 parts) is again added. After cooling and removal from the reactor, the product is essentially identical to that produced above and the catalyst remaining in the reactor can be recycled again.

Example 3

The synthesis is carried out as in Example 2 except that all of the reactants are precharged (including the propylene oxide). A reaction time of four and one-half hours at 105° C. is required to give a product identical to that in Example 2.

Example 4

The synthesis is carried out as in Example 2 except 72 parts (1 mole) of 1,2-butylene oxide is substituted for propylene oxide and the reaction is run at 115° C. The product has the following assay:

| | Percent |
|---|---|
| Hydroxybutyl methacrylate (by vapor phase chromatograph) | 46 |
| Methacrylic acid (by titration with standard base) | 1 |
| Butylene glycol dimethacrylate (by vapor phase chromatograph) | .3 |
| Potassium methacrylate (by wet chemical analysis for potassium) | .14 |

We claim:

1. A method for the preparation of hydroxyalkyl methacrylates, which comprises reacting in the temperature range of about 65° to about 130° C. in the presence of an inert, volatile, organic solvent, methacrylic acid with an alkylene oxide containing 2 to 4 carbon atoms in the presence of potassium methacrylate whereby an essentially 1:1 molar complex is formed between said potassium methacrylate and said methacrylic acid, said potassium methacrylate being used in amounts of about 2 to 8 mole percent based on said methacrylic acid, cooling the reaction medium at the conclusion of the reaction to a temperature of no higher than 10° C. such that said molar complex forms a precipitate and separating the product therefrom.

2. A method according to claim 1 in which said solvent is xylene.

3. A method according to claim 2 wherein the hydroxyalkyl methacrylate is hydroxyethyl methacrylate, alkylene oxide is ethylene oxide, the reaction is conducted in the range of about 70° to about 90° C., the potassium methacrylate is prepared in situ and the insoluble molar complex is separated from the product.

4. A method according to claim 2 wherein the hydroxyalkyl methacrylate is hydroxypropyl methacrylate, alkylene oxide is propylene oxide, the reaction is conducted in the range of about 95° to about 115° C., the potassium methacrylate is prepared in situ and the insoluble molar complex is separated from the product.

5. A method according to claim 2 wherein the hydroxyalkyl methacrylate is hydroxybutyl methacrylate, alkylene oxide is butylene oxide, the reaction is conducted in the range of about 100° to about 125° C., the potassium methacrylate is prepared in situ and the insoluble molar complex is separated from the product.

References Cited by the Examiner

UNITED STATES PATENTS 2,929,835  3/1960  Hayes _____ 260—486

LORRAINE A. WEINBERGER, *Primary Examiner.*

ALBERT P. HALLUIN, D. P. CLARKE,
*Assistant Examiners.*